United States Patent
Huang et al.

(10) Patent No.: US 12,252,030 B2
(45) Date of Patent: Mar. 18, 2025

(54) BATTERY SWAPPING METHOD, SERVER AND BATTERY INSTALLING-AND-REMOVING DEVICE

(71) Applicant: CONTEMPORARY AMPEREX TECHNOLOGY (HONG KONG) LIMITED, Hong Kong (CN)

(72) Inventors: Zhenhui Huang, Ningde (CN); Hang Ma, Ningde (CN); Yongchao Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 360 days.

(21) Appl. No.: 17/705,429

(22) Filed: Mar. 28, 2022

(65) Prior Publication Data

US 2023/0069338 A1    Mar. 2, 2023

Related U.S. Application Data

(63) Continuation of application No. PCT/CN2021/115758, filed on Aug. 31, 2021.

(51) Int. Cl.
*B60L 53/80* (2019.01)
*B60L 50/60* (2019.01)
(Continued)

(52) U.S. Cl.
CPC ............. *B60L 53/80* (2019.02); *B60L 50/60* (2019.02); *B60L 53/36* (2019.02); *B60S 5/06* (2013.01)

(58) Field of Classification Search
CPC .................................. B60S 5/06; B60L 53/80
See application file for complete search history.

(56) References Cited

U.S. PATENT DOCUMENTS

| | | | |
|---|---|---|---|
| 8,500,094 B2 | 8/2013 | Haslberger et al. | |
| 2010/0145717 A1* | 6/2010 | Hoeltzel | B60K 1/04 320/109 |

(Continued)

FOREIGN PATENT DOCUMENTS

| | | | | |
|---|---|---|---|---|
| CA | 2648972 A1 * | 6/2009 | .......... | B60L 11/1818 |
| CN | 201881867 U | 6/2011 | | |

(Continued)

OTHER PUBLICATIONS

The First Office Action for KR Application No. 10-2021-7034625, dated Aug. 24, 2023, 8 pages.

(Continued)

*Primary Examiner* — David V Henze-Gongola
(74) *Attorney, Agent, or Firm* — East IP P.C.

(57) ABSTRACT

The embodiments of the application provide a battery swapping method, a server and a battery installing-and-removing device. The battery swapping method comprising: receiving battery swapping status information of an electric vehicle; sending a battery removing instruction to a battery installing-and-removing device based on the battery swapping status information; sending a battery installation instruction to the battery installing-and-removing device when detecting that the first battery is transported to the first position; receiving the battery installation information sent by the battery installing-and-removing device; sending a battery swapping completion instruction to the electric vehicle based on the battery installation information.

16 Claims, 9 Drawing Sheets

(51) Int. Cl.
    *B60L 53/36* (2019.01)
    *B60S 5/06* (2019.01)

(56) References Cited

U.S. PATENT DOCUMENTS

| | | | | |
|---|---|---|---|---|
| 2018/0012433 | A1* | 1/2018 | Ricci | G01C 21/3617 |
| 2020/0091565 | A1* | 3/2020 | Väin | H01M 50/20 |
| 2020/0148073 | A1* | 5/2020 | Sasu | B60L 58/27 |
| 2021/0367221 | A1* | 11/2021 | Ing | H02J 7/0013 |

FOREIGN PATENT DOCUMENTS

| | | |
|---|---|---|
| CN | 102152776 A | 8/2011 |
| CN | 102152776 B | 10/2013 |
| CN | 107757398 A | 3/2018 |
| CN | 108128285 A | 6/2018 |
| CN | 111452661 A | 7/2020 |
| CN | 111885135 A | 11/2020 |
| CN | 212148518 U | 12/2020 |
| CN | 113147497 A | 7/2021 |
| CN | 111931143 B | 8/2021 |
| JP | 2020532940 A | 11/2020 |
| JP | 2021508432 A | 3/2021 |
| KR | 20160092733 A | 8/2016 |
| WO | 2020033474 A1 | 2/2020 |
| WO | 2020089935 A1 | 5/2020 |
| WO | 2020190147 A1 | 9/2020 |

OTHER PUBLICATIONS

The extended European search report for European Application No. 21870533.3, dated Oct. 17, 2022, 10 pages.
The International search report for PCT Application No. PCT/CN2021/115758, dated Apr. 8, 2022, 7 pages.
The First Office Action for CN Application No. 202180006458.6, dated Oct. 16, 2023, 17 pages.
The First Office Action for JP Application No. 2021-560124, dated Oct. 26, 2023, 10 pages.
The Communication pursuant to Article 94(3) EPC for European Application No. 21870533.3, dated Nov. 20, 2023, 6 pages.

* cited by examiner

BATTERY SWAPPING METHOD, SERVER AND BATTERY INSTALLING-AND-REMOVING DEVICE

CROSS-REFERENCE TO RELATED APPLICATIONS

The present application is a continuation of International Application No. PCT/CN2021/115758, filed on Aug. 31, 2021, the contents of which are hereby incorporated by reference in its entirety.

FIELD OF THE INVENTION

The present application relates to the field of batteries, in particular to a battery swapping method, a server and a battery installing-and-removing device.

BACKGROUND OF THE INVENTION

Electric vehicles are increasingly favored by consumers due to their advantages such as environmental protection and good driving experience. As one of the important components of electric vehicles, batteries are mainly used to supply power to electric vehicles to ensure the normal operation of the electric vehicles. When the battery power of the electric vehicle is exhausted, the way to supplement electric energy of the electric vehicles by charging the batteries cannot meet the timeliness requirements of users. Therefore, the way to supplement electric energy of the electric vehicles is gradually changed from charging to battery swapping, that is, the electric vehicles are driven to a battery swapping station to replace the batteries of the electric vehicles in a power loss state with the batteries of the battery swapping station in a full power state prepared in advance. However, during the current battery swapping process, most steps need to be completed by human operator, and the operation is time-consuming and laborious, resulting in low battery swapping efficiency.

SUMMARY OF THE INVENTION

The embodiments of the application provide a battery swapping method, a server and a battery installing-and-removing device capable of improving battery swapping efficiency.

In the first aspect, a battery swapping method is provided, comprising a battery swapping method applied to a server in a battery swapping station. The method comprising: receiving battery swapping status information of an electric vehicle; sending a battery removing instruction to a battery installing-and-removing device based on the battery swapping status information, the battery removing instruction is configured for instructing the battery installing-and-removing device to remove a first battery from the electric vehicle and transport the first battery to a first position; sending a battery installation instruction to the battery installing-and-removing device when detecting that the first battery is transported to the first position; receiving the battery installation information sent by the battery installing-and-removing device, the battery installation information is configured for indicating that a second battery is to be installed by the battery installing-and-removing device to the electric vehicle; wherein power of the second battery is higher than power of the first battery; sending a battery swapping completion instruction to the electric vehicle based on the battery installation information;

By using the technical solution of the embodiments of the application, a battery swapping method suitable for a battery swapping station is provided. During an electric vehicle driving into the battery swapping station for exchanging batteries, a server in the battery swapping station may instruct a battery installing-and-removing device, by a battery removing instruction, to remove a first battery from the electric vehicle; and instruct the battery installing-and-removing device, by a battery installation information, to install a second battery with a higher power than that of the first battery, when detecting that the first battery is transported to a first position, so as to replace battery pack in the electric vehicle. Therefore, according to the technical solution of the embodiments of the application, there is no need for manual intervention in the battery swapping process, and the battery swapping efficiency may be improved compared with the traditional manual battery swapping.

In one possible implementation, the battery swapping station is provided with a first battery compartment, and the first battery compartment comprises at least two charging positions. The method further comprises: sending a battery transporting instruction to a transporting device when detecting that the first battery is transported to the first position, the battery transporting instruction is configured for instructing the transporting device to transport the first battery from the first position to the first battery compartment; receiving battery identity information of the first battery sent by the transporting device, the battery identity information is information obtained during transportation of the first battery to the first battery compartment by the transporting device; determining a charging position corresponding to the battery identity information from the at least two charging positions; sending compartment-dividing instruction information to the transporting device, and the compartment-dividing instruction information is configured for instructing the transporting device to transport the first battery to a charging position corresponding to the battery identity information.

In this implementation, after the first battery is transported to the first position by said battery installing-and-removing device, the first battery is then transported to a battery charging position by the transporting device, so that the battery swapping efficiency may be improved. In addition, the charging position of the first battery may be determined according to identity information of the first battery obtained by the transporting device during transportation of the first battery, so as to avoid errors.

In one possible implementation, the method further comprises: receiving a battery-in-place instruction sent by the transporting device, the battery-in-place instruction is an instruction sent when the first battery is transported to the charging position corresponding to the battery identity information by the transporting device. The sending the battery installation instruction to the battery installing-and-removing device comprises: sending the battery installation instruction to the battery installing-and-removing device based on the battery-in-place instruction.

In this implementation, the battery installation instruction is sent by the server to the battery installing-and-removing device when the first battery is transported to the charging position of the battery compartment, to avoid the situation that the first battery is removed but not charged, and reduce the maloperation rate in the process of battery swapping.

In one possible implementation, the method further comprises: sending a battery installing-and-removing instruction to the transporting device, the battery installing-and-removing instruction is configured for instructing the transporting device to transport the second battery from a second battery compartment to a second position; wherein the battery installation instruction is configured for instructing the battery installing-and-removing device to pick the second battery from the second position.

In this implementation, the second battery may be transported to the second position in advance by the transporting device, so that the battery installing-and-removing device can quickly pick the second battery from the second position for installation, improving the battery swapping efficiency.

In one possible implementation, the method further comprises: receiving an identity authentication information of the electric vehicle when the electric vehicle travels to a gate entrance and exit, the identity authentication information is information obtained and sent by a gate system of the gate entrance and exit; obtaining a vehicle authentication result based on the identity authentication information; sending a gate opening instruction to the gate system under a condition that the vehicle authentication result is authentication-passed, the gate opening instruction is configured for instructing the gate system to control a gate at the gate entrance and exit to open.

In this implementation, when the vehicle enters the battery swapping station, the identity authentication information of the vehicle can be authenticated through the server, and when the authentication is authentication-passed, the controlling gate is opened to allow the electric vehicle to enter the battery swapping station and avoid the occupation of the battery swapping resources of the battery swapping station.

In one possible implementation, the obtaining the vehicle authentication result based on the identity authentication information comprises: sending the identity authentication information to a cloud server; receiving the vehicle authentication result sent by the cloud server, the vehicle authentication result is a result generated by the cloud server based on the vehicle authentication information.

In this implementation, the identity authentication information may be authenticated through the cloud server to improve the authentication efficiency.

In one possible implementation, the battery swapping station is further provided with an in-station wireless communication module, and the in-station wireless communication module is communicatively connected with the server; the method further comprises: sending a battery swapping request to the electric vehicle via the in-station wireless communication module when the electric vehicle establishes a wireless communication connection with the in-station wireless communication module; wherein the battery swapping status information is a request sent to the in-station wireless communication module by the electric vehicle based on the battery swapping request.

In this implementation, the electric vehicle is communicated with the server through the in-station wireless communication module, such that the communication between the electric vehicle and the server is not limited by wired communication, improving the convenience of battery swapping and increasing application scenarios.

In the second aspect, a battery swapping method is provided for applying to a battery installing-and-removing device in a battery swapping station, the method comprising: receiving a battery removing instruction sent by a server in the battery swapping station, the battery removing instruction is an instruction sent by the server based on battery swapping status information, the battery swapping status information is information sent to the server by an electric vehicle; removing a first battery from the electric vehicle and transporting the first battery to a first position based on the battery removing instruction; receiving a battery installation instruction sent by the server, the battery installation instruction is an instruction sent by the server when detecting that the first battery is transported to the first position; installing a second battery into the electric vehicle and generating battery installation information based on the battery installation instruction; sending the battery installation information to the server; wherein power of the second battery is higher than power of the first battery.

In one possible implementation, the installing the second battery into the electric vehicle based on the battery installation instruction comprises: picking the second battery from a second position and installing the second battery into the electric vehicle based on the battery installation instruction, wherein the second battery is a battery transported from a second battery compartment to the second position by a transporting device based on a battery installing-and-removing instruction sent by the server.

In the third aspect, a server is provided, comprising: a battery swapping status information receiving unit configured to receive battery swapping status information of an electric vehicle; a battery removing instruction sending unit configured to send a battery removing instruction to a battery installing-and-removing device based on the battery swapping status information, the battery removing instruction is configured for instructing the battery installing-and-removing device to remove a first battery from the electric vehicle and transport the first battery to a first position; a battery installation instruction sending unit configured to send a battery installation instruction to the battery installing-and-removing device when detecting that the first battery is transported to the first position; a battery installation information receiving unit configured to receiving receive the battery installation information sent by the battery installing-and-removing device, the battery installation information is configured for indicating that a second battery is to be installed by the battery installing-and-removing device to the electric vehicle; a battery swapping completion instruction sending unit configured to send a battery swapping completion instruction to the electric vehicle based on the battery installation information; wherein power of the second battery is higher than power of the first battery.

In one possible implementation, the battery swapping station is provided with a first battery compartment, and the first battery compartment comprises at least two charging positions. The server further comprises: a battery transporting instruction sending unit configured to send a battery transporting instruction to a transporting device when detecting that the first battery is transported to the first position, the battery transporting instruction is configured for instructing the transporting device to transport the first battery from the first position to the first battery compartment; a battery identity information receiving unit configured to receive battery identity information of the first battery sent by the transporting device, the battery identity information is information obtained during transportation of the first battery to the first battery compartment by the transporting device; a charging position determination unit configured to determine a charging position corresponding to the battery identity information from the at least two charging positions; a compartment-dividing instruction information sending unit configured to send compartment-dividing instruction information to the transporting device, the compartment-dividing instruction information is configured for instructing the transporting device to transport the first battery to a charging position corresponding to the battery identity information.

In one possible implementation, the server further comprises: a battery-in-place instruction receiving unit configured to receive a battery-in-place instruction sent by the transporting device, the battery-in-place instruction is an instruction sent when the first battery is transported to the charging position corresponding to the battery identity information by the transporting device; the battery installation instruction sending unit, specifically configured for sending the battery installation instruction to the battery installing-and-removing device based on the battery-in-place instruction.

In one possible implementation, the server further comprises: a battery installing-and-removing instruction sending unit configured to send a battery installing-and-removing instruction to the transporting device, the battery installing-and-removing instruction is configured for instructing the transporting device to transport the second battery from a second battery compartment to a second position; wherein the battery installation instruction is configured for instructing the battery installing-and-removing device to pick the second battery from the second position.

In one possible implementation, the server further comprises: an identity authentication information receiving unit configured to receive an identity authentication information of the electric vehicle when the electric vehicle travels to a gate entrance and exit, the identity authentication information is information obtained and sent by a gate system of the gate entrance and exit; a vehicle authentication result obtaining unit configured to obtain a vehicle authentication result based on the identity authentication information; a gate opening instruction sending unit configured to send a gate opening instruction to the gate system under a condition that the vehicle authentication result is authentication-passed, the gate opening instruction is configured for instructing the gate system to control a gate at the gate entrance and exit to open.

In one possible implementation, the vehicle authentication result obtaining unit comprises: an identity authentication information sending subunit configured to send the identity authentication information to a cloud server; a vehicle authentication result receiving subunit configured to receive the vehicle authentication result sent by the cloud server, the vehicle authentication result is a result generated by the cloud server based on the vehicle authentication information.

In one possible implementation, the battery swapping station is further provided with an in-station wireless communication module, and the in-station wireless communication module is communicatively connected with the server. The server further comprises: a power exchanging request sending unit configured to send a battery swapping request to the electric vehicle via the in-station wireless communication module when the electric vehicle establishes a wireless communication connection with the in-station wireless communication module; wherein the battery swapping status information is a request sent to the in-station wireless communication module by the electric vehicle based on the battery swapping request.

In the fourth aspect, a battery installing-and-removing device is provided, comprising: a battery removing instruction receiving unit configured to receive a battery removing instruction sent by a server in a battery swapping station, the battery removing instruction is an instruction sent by the server based on battery swapping status information, the battery swapping status information is information sent to the server by an electric vehicle; a first battery removing unit configured to remove a first battery from the electric vehicle and transport the first battery to a first position based on the battery removing instruction; a battery installation instruction sending unit configured to receive a battery installation instruction sent by the server, the battery installation instruction is an instruction sent by the server when detecting that the first battery is transported to the first position; a second battery installing unit configured to install a second battery into the electric vehicle and generate battery installation information based on the battery installation instruction; a battery installation information sending unit configured to send the battery installation information to the server; wherein power of the second battery is higher than power of the first battery.

In one possible implementation, the battery installing-and-removing device is specifically configured for: picking the second battery from a second position and installing the second battery into the electric vehicle based on the battery installation instruction, wherein the second battery is a battery transported from a second battery compartment to the second position by a transporting device based on a battery installing-and-removing instruction sent by the server.

In the fifth aspect, a server is provided, comprising a processor and a memory, the memory is configured for storing computer programs, and the processor is configured for calling the computer programs to implement the battery swapping method of the first aspect and any possible one of the implementations in the first aspect.

In the sixth aspect, a battery installing-and-removing device is provided, comprising a processor and a memory, the memory is configured for storing computer programs, and the processor is configured for calling the computer programs to implement the battery swapping method of the second aspect and any possible one of the implementations in the second aspect.

BRIEF DESCRIPTION OF THE DRAWINGS

The drawings needed to be used in the embodiments of the application will be briefly introduced below in order to illustrate the technical solutions of the embodiments of the application more clearly. It is obvious that the drawings described below are only some embodiments of the application. For the ordinary skilled in the art, other drawings may also be obtained from the drawings without paying any creative labor.

DETAILED DESCRIPTION

The implementations of the present application are described in further detail below in combination with the accompanying drawings and embodiments. The detailed description of the following embodiments and the accompanying drawings are used to illustrate the principles of the present application by way of example, rather than limit the scope of the present application, that is, the present application is not limited to the described embodiments.

In the description of this application, it should be noted that unless otherwise specified, "multiple" means more than two; the orientation or positional relationship indicated by the terms "up", "down", "left", "right", "inside", 'outside" is only for the convenience of describing the application and simplifying for the description, rather than indicating or implying that the device or element referred to must have a specific orientation, be constructed and operated in a specific orientation, so that it cannot be understood as a limitation for the application. In addition, the terms "first", "second", "third" and the like are only used for illustrative purposes and cannot be understood as indicating or implying relative importance.

Figure 1:
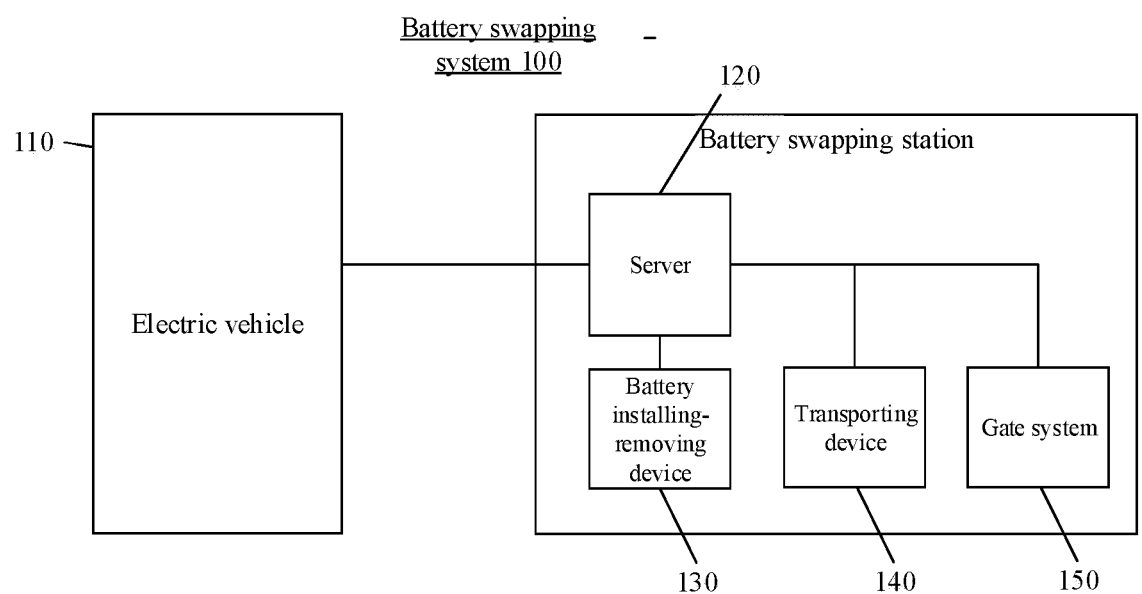
FIG. 1 is an architecture diagram of a battery swapping system applicable to an embodiment of the present application.

FIG. 1 shows an architecture diagram of a battery swapping system applicable to an embodiment of the present application.

As shown in FIG. 1, the battery swapping system 100 may include an electric vehicle 110, a server 120, and a battery installing-and-removing device 130.

At least one battery pack is arranged in the electric vehicle 110, the at least one battery pack is used to provide electric power for the electric vehicle 110 to ensure the normal driving for the electric vehicle 110. When the at least one battery pack is in power loss state (that is, the power of the battery pack is lower than a first preset power, such as lower than 30%), the electric vehicle 110 may be driven into a battery swapping station for battery swapping, that is, the battery pack in power loss state may be replaced by a battery pack with sufficient power (that is, the power of the battery pack is higher than a second preset power, such as higher than 80%).

The server 120 and battery installing-and-removing device 130 described above are arranged in the battery swapping station. After the electric vehicle 110 is driven into the battery swapping station, the server 120 may interact with the electric vehicle 110 and battery installing-and-removing device 130 to control the battery installing-and-removing device 130 to remove the battery pack in power loss state from the electric vehicle 110, and install the battery pack with sufficient power in the battery swapping station into the electric vehicle 110. Wherein the battery installing-and-removing device 130 may be an automated guided vehicle (Automated Guided Vehicle, AGV), etc.

Optionally, the battery swapping system 100 described above may also include a transporting device 140, which may transport the battery in the battery swapping station under the control of the server 120. Wherein the transporting device 140 may be a stacker, etc.

Optionally, the battery swapping system 100 described above may also include a gate system 150, which may allow or prevent the electric vehicle 110 from driving into the battery swapping station under the control of the server 120.

Figure 2:
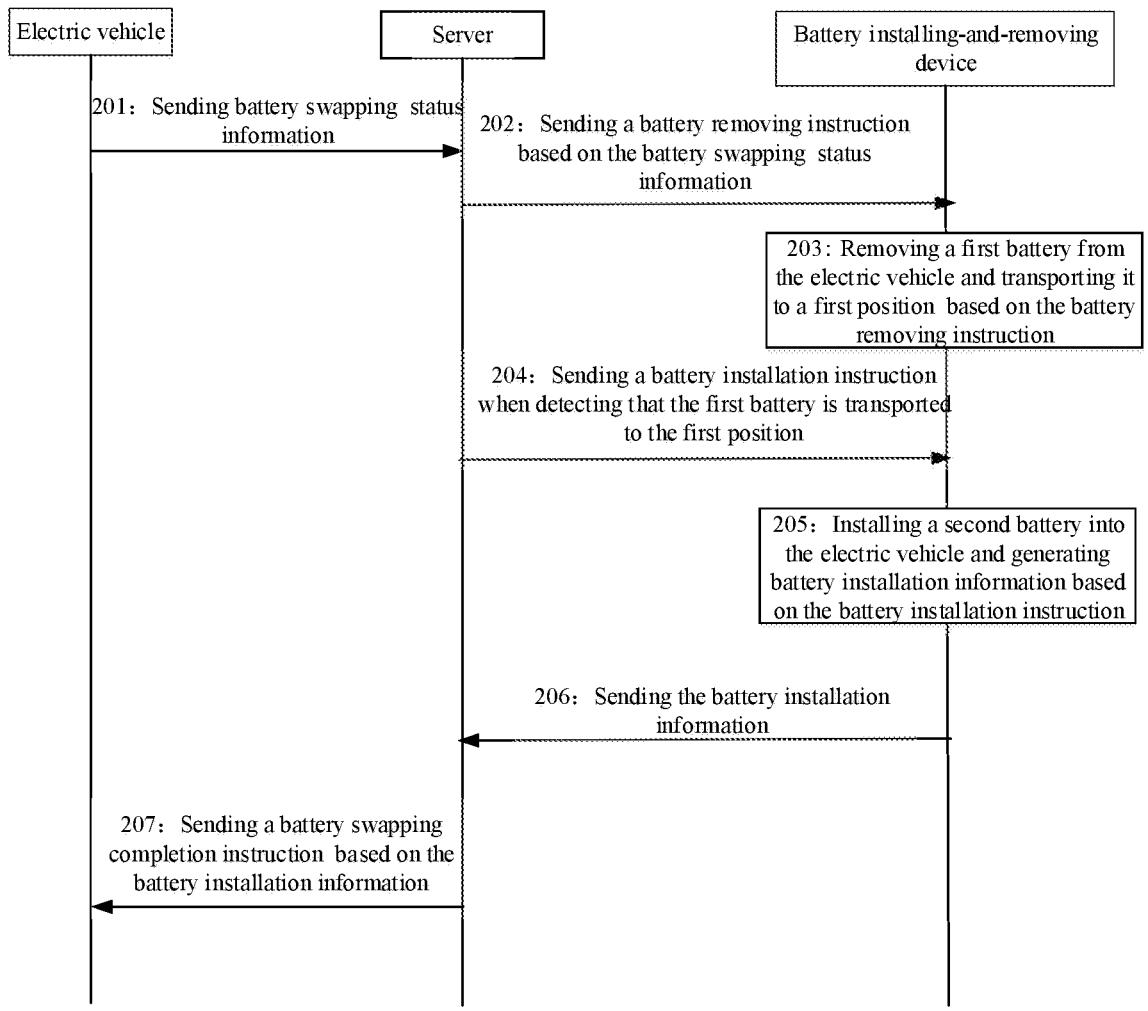
FIG. 2 is a schematic flowchart of a battery swapping method provided by an embodiment of the application.

FIG. 2 shows a schematic flow diagram of a battery swapping method proposed by an embodiment of the application. Alternatively, the method of the embodiment of the application may be applicable to the server 120 and the battery installing-and-removing device 130 shown in FIG. 1 above.

As shown in FIG. 2, the battery swapping method may include the following steps.

Step 201: sending battery swapping status information to the server by the electric vehicle.

Step 202: sending a battery removing instruction to the battery installing-and-removing device by the server based on the battery swapping status information.

Step 203: removing a first battery from the electric vehicle and transporting the first battery to a first position by the battery installing-and-removing device based on the battery removing instruction.

Step 204: sending a battery installation instruction to the battery installing-and-removing device by the server, when detecting that the first battery is transported to the first position.

Step 205: installing a second battery into the electric vehicle and generating battery installation information by the battery installing-and-removing device based on the battery installation instruction, wherein power of the second battery is higher than power of the first battery.

Step 206: sending the battery installation information to the server by the battery installing-and-removing device.

Step 207: sending a battery swapping completion instruction to the electric vehicle by the server based on the battery installation information.

By using the technical solution of the embodiments of the application, a battery swapping method suitable for a battery swapping station is provided. During an electric vehicle driving into the battery swapping station for exchanging batteries, a server in the battery swapping station may instruct a battery installing-and-removing device, by a battery removing instruction, to remove a first battery from the electric vehicle; and instruct the battery installing-and-removing device, by a battery installation information, to install a second battery with a higher power than that of the first battery, when detecting that the first battery is transported to a first position, so as to replace battery pack in the electric vehicle. Therefore, according to the technical solution of the embodiments of the application, there is no need for manual intervention in the battery swapping process, and the battery swapping efficiency may be improved compared with the traditional manual battery swapping.

In the step 201 described above, when the electric vehicle is driven into the battery swapping station and needs battery swapping, the battery swapping status information may be sent to the server in the battery swapping station by the electric vehicle.

Wherein the above battery swapping status information may be any information capable of indicating whether the electric vehicle is in a state to be power exchanged. Specifically, the above battery swapping status information may include a high voltage state of the whole vehicle, a relay state and a quick changing lock state of the electric vehicle.

It should be noted that sending the battery swapping status information to the server by the electric vehicle described above may be that: obtaining the battery swapping status information by the electric vehicle and sending it to the server when the electric vehicle is driven into the battery swapping station and reaches a predetermined battery swapping position.

Alternatively, sending the battery swapping status information to the server by the electric vehicle described above may also include: when the electric vehicle is driven into the battery swapping station, if the server is communicated with the electric vehicle, then a battery swapping request is sent to the electric vehicle by the server; the battery swapping request is received by the electric vehicle and its battery swapping status information is obtained based on the battery swapping request; the battery swapping status information is sent to the server by the electric vehicle.

In an embodiment of the application, the above server establishes a communication with the electric vehicle, which may be established through wired mode; alternatively, the server may establish a wireless communication with the electric vehicle.

Figure 3:
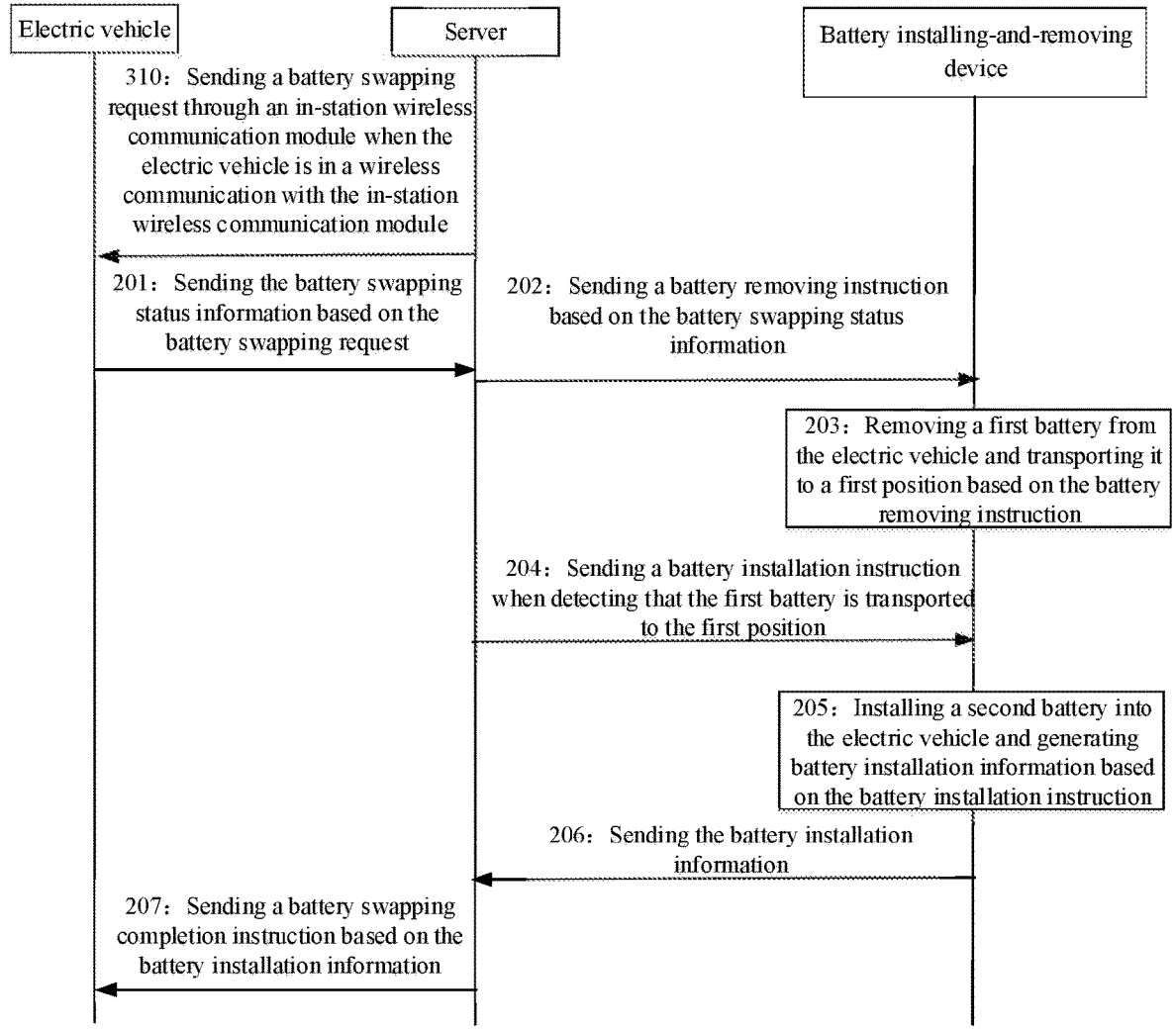
FIG. 3 is a schematic flowchart of another battery swapping method provided by an embodiment of the application.

In a possible implementation, an in-station wireless communication module is also arranged in the battery swapping station, and the in-station wireless communication module is communicated with the server. As shown in FIG. 3, before the above step 201, it may also include:

Step 310: sending a battery swapping request to the electric vehicle through the in-station wireless communication module, when the electric vehicle is in a wireless communication with the in-station wireless communication module;

The above step 201 may include:

Sending the battery swapping status information to the server by the electric vehicle through the in-station wireless communication module, based on the battery swapping request.

In this implementation, the communication between the electric vehicle and the server is performed through the in-station wireless communication module, which enables that the communication between the electric vehicle and the server is not limited by wired communication, improving the convenience of battery swapping and increasing application scenarios.

It should be noted that the electric vehicle is in a wireless communication with the in-station wireless communication module described above may be that: an on-board wireless communication module is arranged in the electric vehicle, and the electric vehicle is communicated with the in-station wireless communication module through its on-board wireless communication module.

Wherein both the on-board wireless communication module and the in-station wireless communication module may include at least one of a Bluetooth communication module, an infrared communication module and a wireless high fidelity module.

In addition, the in-station wireless communication module may be integrated into the server or arranged independently from the server. While the in-station wireless communication module is arranged independently from the server, the in-station wireless communication module may be communicated with the server by wired communication.

Figure 4:
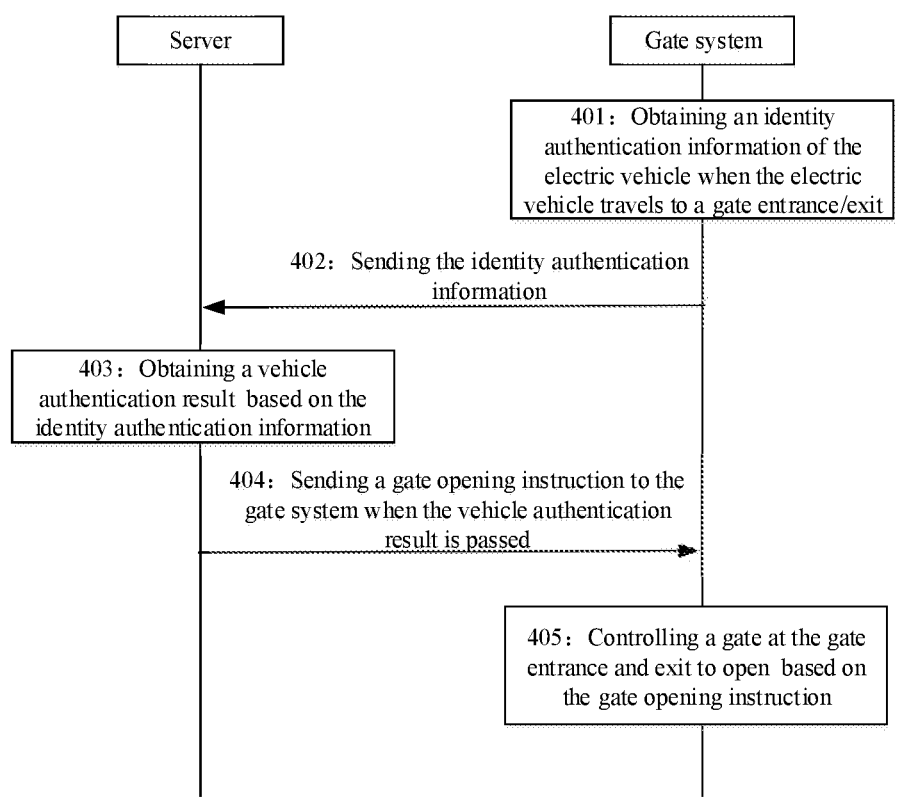
FIG. 4 is a schematic flowchart of another battery swapping method provided by an embodiment of the application.

In a possible implementation, as shown in FIG. 4, before the above step 201, the method may also include:

Step 401: obtaining an identity authentication information of the electric vehicle by a gate system, when the electric vehicle travels to a gate entrance and exit;
Step 402: sending the identity authentication information to the server by the gate system;
Step 403: Obtaining a vehicle authentication result by the server based on the identity authentication information;
Step 404: sending a gate opening instruction to the gate system by the server when the vehicle authentication result is authentication-passed;
Step 405: controlling the gate at the gate entrance and exit to open by the gate system based on the gate opening instruction.

In this implementation, when the vehicle enters the battery swapping station, the identity authentication information of the vehicle can be authenticated through the server, and when the authentication is authentication-passed, the controlling gate is opened to allow the electric vehicle to enter the battery swapping station and avoid the occupation of the battery swapping resources of the battery swapping station.

Wherein the identity authentication information of the electric vehicle may be any information for determining whether the electric vehicle has the permission to enter the battery swapping station. For example, the identity authentication information may include license number, license type and other information.

In addition, obtaining the vehicle authentication result by the server based on the identity authentication information described above may be that: determining, by the sever, whether the electric vehicle has the permission to enter the power station according to the identity authentication information. If so, the vehicle authentication result is authentication-passed, otherwise, the vehicle authentication result is not passed.

For example, if the above identity authentication information includes a license type and the server determines that the license type is an electric vehicle license, then it is determined by the sever that the vehicle authentication result is authentication-passed; and if the server determines that the license type is a fuel vehicle license, then it is determined by the server that the authentication result is not passed.

It should be noted that obtaining the vehicle authentication result by the server based on the identity authentication information described above may be a process in which the authentication information is preset in the server and the identity authentication information is authenticated by the server.

Figure 5:
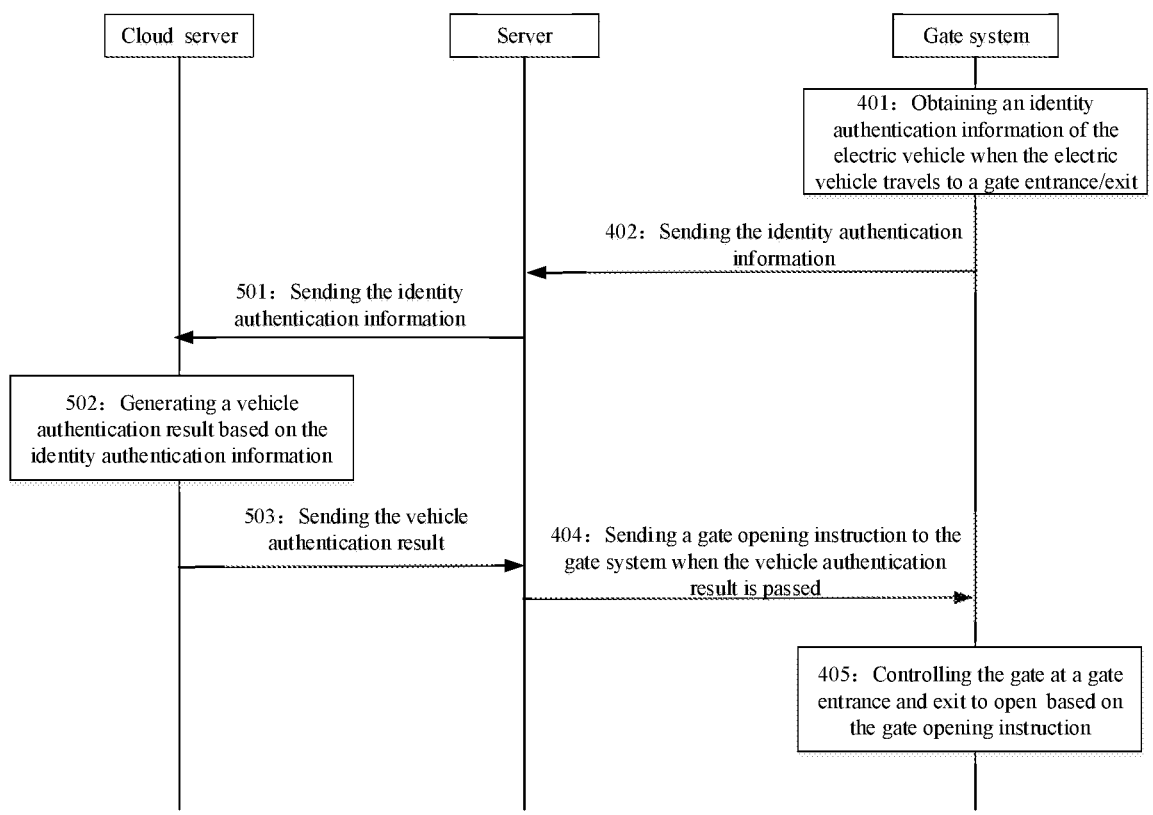
FIG. 5 is a schematic flowchart of another battery swapping method provided by an embodiment of the application.

In a possible implementation, as shown in FIG. 5, after the above step 402, the method may also include:

Step 501: sending identity authentication information to a cloud server by the server;
Step 502: generating a vehicle authentication result by the cloud server based on the identity authentication information;
Step 503: sending the vehicle authentication result to the server by the cloud server.

In this implementation, the identity authentication information may be authenticated through the cloud server to improve the authentication efficiency.

In the above step 202, after the server receives the battery swapping status information sent by the electric vehicle, a battery removing instruction is sent to the battery installing-and-removing device by the server based on the battery swapping status information.

Wherein sending the battery removing instruction to the battery installing-and-removing device by the server based on the battery swapping status information may be that: it is determined by the server whether the battery swapping status information meets the preset conditions, and if so, the server then sends a battery removing instruction to the battery installing-and-removing device.

For example, if the above battery swapping status information includes a relay state and a quick changing lock state of the electric vehicle, the server determines whether the relay of the electric vehicle is disconnected and the quick changing lock is unlocked according to the battery swapping status information, and sends the battery removing instruction to the battery installing-and-removing device when the relay is disconnected and the quick changing lock is unlocked.

It should be noted that the above server may also communicated with the battery installing-and-removing device through the above in-station wireless communication module.

In the above step 203, after the battery removing instruction is received by the battery removing device, the battery removing device may remove the first battery from the electric vehicle and transport it to the first position based on the battery removing instruction.

Wherein, since a plurality of battery packs may be arranged in the electric vehicle, the battery removing instruction may be an instruction for indicating at least one of the plurality of battery packs, that is, the first battery may include the at least one of the battery packs.

At this time, removing the first battery from the electric vehicle by the battery installing-and-removing device based on the battery removing instruction may be that: moving the battery installing-and-removing device to a parking position for the electric vehicle. The battery installing-and-removing device determines at least one battery pack indicated by the battery removing instruction and removes the at least one battery pack from the electric vehicle.

In addition, the above first position may be any position specified in advance in the battery swapping station. Specifically, it can be the first battery compartment in the battery swapping station, which is used to charge the battery removed from the electric vehicle.

For example, after the battery installing-and-removing device removes the first battery from the electric vehicle, the battery installing-and-removing device transports the first battery into the first battery compartment to charge the first battery.

Of course, the above first position can also be any position other than the first battery compartment. For example, the first position may be a power-loss battery transfer compartment. Then, after the battery installing-and-removing device transports the first battery to the power-loss battery transfer compartment, the first battery may also be transported from the power-loss battery transfer compartment to a battery charging compartment through other devices for charging.

Figure 6:
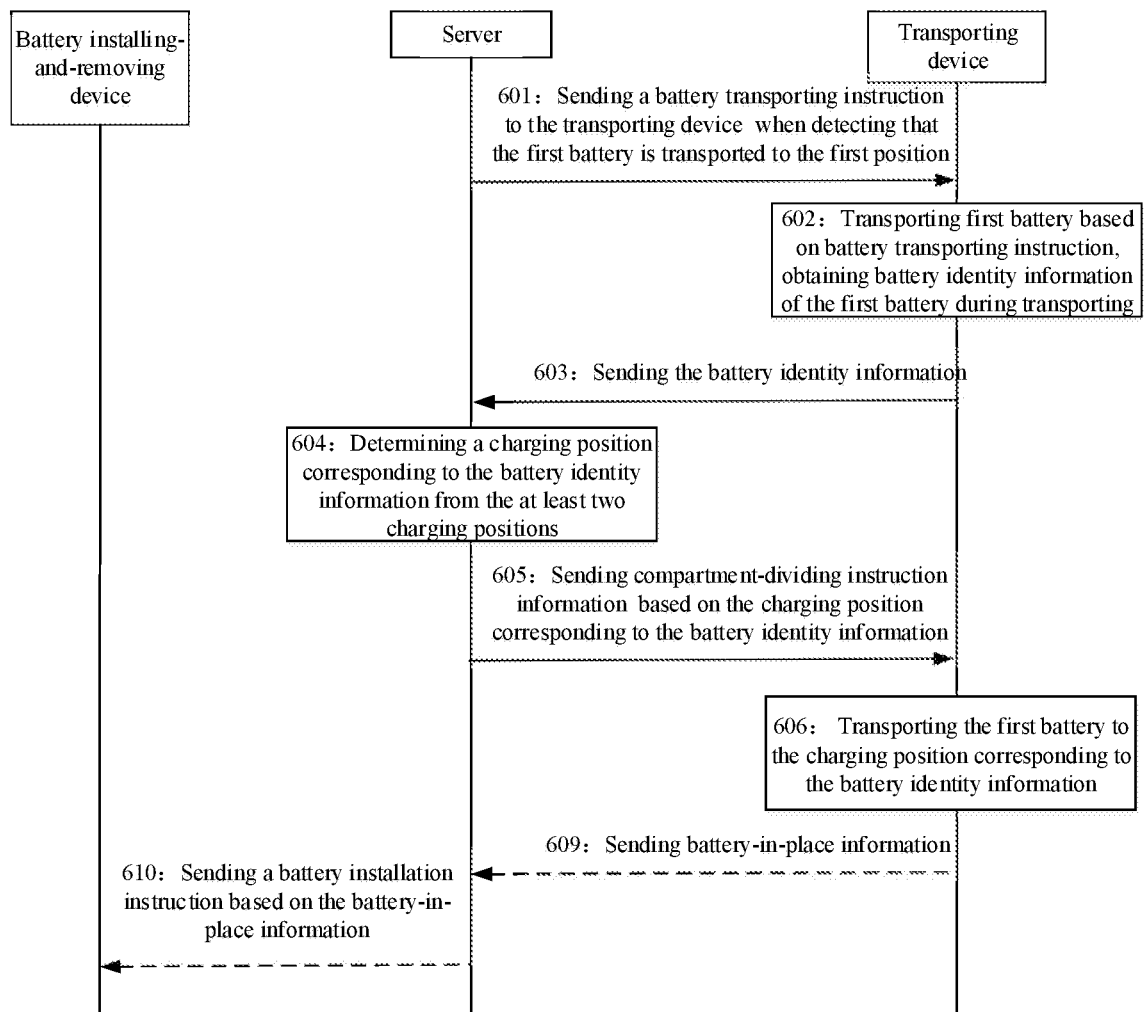
FIG. 6 is a schematic flowchart of another battery swapping method provided by an embodiment of the application.

In one possible implementation, the battery swapping station is provided with a first battery compartment, and the first battery compartment includes at least two charging positions. As shown in FIG. 6, after the above step 203, the method may also include:

Step 601: sending a battery transporting instruction to the transporting device by the server when detecting that the first battery is transported to the first position, the battery transporting instruction is configured for instructing the transporting device to transport the first battery from the first position to the first battery compartment;

Step 602: transporting the first battery based on the battery transporting instruction, and obtaining the battery identity information of the first battery during the transporting process;

Step 603: sending the battery identity information to the server by the transporting device;

Step 604: determining a charging position corresponding to the battery identity information from the at least two charging positions by the server;

Step 605: sending compartment-dividing instruction information to the transporting device based on the charging position corresponding to the battery identity information;

Step 606: transporting the first battery to the charging position corresponding to the battery identity information by the transporting device.

In this implementation, after the first battery is transported to the first position by said battery installing-and-removing device, the first battery is then transported to a battery charging position by the transporting device, so that the battery swapping efficiency may be improved. In addition, the charging position of the first battery may be determined according to identity information of the first battery obtained by the transporting device during transportation of the first battery, so as to avoid errors.

Wherein the battery identity information may be any information capable of identifying the identity of the first battery. Specifically, the battery identity information may include at least one of media access control address (Media Access Control Address, MAC) of the first battery and battery pack identification.

In addition, determining a charging position corresponding to the battery identity information from the at least two charging positions by the server may be that: selecting one charging position from the at least two charging positions by the server and establishing a binding relationship between the battery identity information and the selected charging position. That is, the above charging position corresponding to the battery identity information is a battery charging position in binding relationship with the battery identity information.

In the above step 204, after the battery installing-and-removing device removes the first battery from the electric vehicle, the server detects whether the battery installing-and-removing device transports the first battery to the first position, and if the first battery is transported to the first position by the battery installing-and-removing device, the server sends a battery installation instruction to the battery installing-and-removing device.

Wherein sending the battery installation instruction to the battery installing-and-removing device by the server described above may be that: the server is provided with a sensing device at the first position. If the first battery is transported to the first position by the battery installing-and-removing device, the sensing device detects the first battery and triggers the battery-in-place instruction, and the server sends a battery installation instruction to the battery installing-and-removing device according to the battery-in-place instruction. Alternatively, if the first battery is transported to the first position by the battery installing-and-removing device, the battery installing-and-removing device sends a battery-in-place instruction to the server, and the server sends a battery installation instruction to the battery installing-and-removing device according to the battery-in-place instruction.

In a possible implementation, as shown in FIG. 6, after the above step 408, the method may also include:

Step 609: sending battery-in-place information to the server when the first battery is transported to a charging position corresponding to the above battery identity information by the transporting device;

Sending the battery installation instruction to the battery installing-and-removing device, including:

Step 610: sending a battery installation instruction to the battery installing-and-removing device based on the battery-in-place information.

In this implementation, the battery installation instruction is sent by the server to the battery installing-and-removing device when the first battery is transported to the charging position of the battery compartment, to avoid the situation that the first battery is removed but not charged, and reduce the maloperation rate in the process of battery swapping.

In the above step 205, if the battery installation instruction is received by the battery installing-and-removing device, the battery installing-and-removing device may install a second battery into the electric vehicle and generate battery installation information based on the battery installation instruction.

Wherein the second battery may be a battery having a power higher than that of the first battery, and the second battery may be adapted to the electric vehicle. For example, when the first battery is a power-loss battery with the power less than 30%, the second battery may be a fully charged battery with the power of 100%, and the structure of the first battery is the as the second battery.

In addition, installing the second battery into the electric vehicle by the battery installing-and-removing device based on the battery installation instruction may be that: moving the battery installing-and-removing device to the second battery compartment storing the second battery, removing the second battery and installing it on the electric vehicle.

Figure 7:
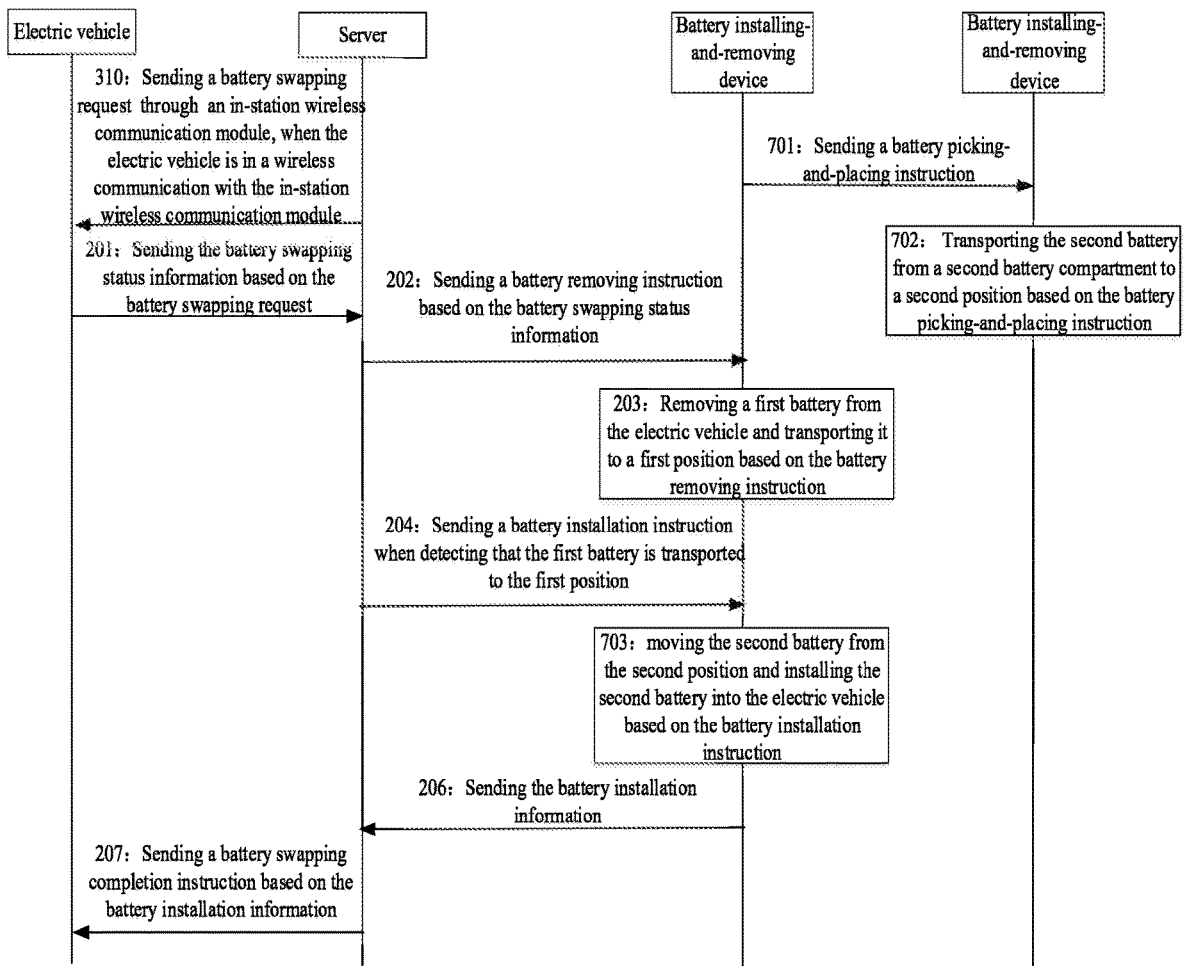
FIG. 7 is a schematic flowchart of another battery swapping method provided by an embodiment of the application.

In a possible implementation, as shown in FIG. 7, after the above step 201, the above method may also include:

Step 701: sending a battery installing-and-removing instruction to the transporting device by the server;

Step 702: transporting the second battery from a second battery compartment to a second position by the transporting device based on the battery installing-and-removing instruction;

Installing the second battery into the electric vehicle by the above battery installing-and-removing device based on the battery installation instruction comprises:

Step 703: moving the second battery from the second position by battery installing-and-removing device and installing the second battery into the electric vehicle based on the battery installation instruction.

In this implementation, the second battery may be transported to the second position in advance by the transporting device, so that the battery installing-and-removing device can quickly pick the second battery from the second position for installation, improving the battery swapping efficiency.

Wherein the second battery compartment may be a compartment for storing battery packs to be installed (such as battery packs with a power higher than a second preset power) in the battery swapping station, which may be different from the first battery compartment. For example, after the battery packs in the first battery compartment are charged, they can be transported to the second battery compartment for storage. Alternatively, the second battery compartment and the first battery compartment may be the same.

It should be noted that the above transporting device for transporting the second battery from the second battery compartment to the second position and the transporting device for transporting the battery from the first position to the first battery compartment may be the same or different transporting device, which is not limited hereby.

In addition, the second position may also be different from the first position. For example, if the first battery compartment and the second battery compartment are the same, and the transporting device for transporting the second battery from the second battery compartment to the second position is the same (such as stacker) as the transporting device for transporting the battery from the first position to the first battery compartment, then the transporting device is provided with two battery placement areas, which are respectively used to place the first battery and the second battery.

Of course, the battery installing-and-removing instruction may be any instruction for instructing the transporting device to transport the second battery from the second battery compartment. Specifically, the battery installing-and-removing instruction may include at least one of battery charging position information, battery installing-and-removing sequence information, etc.

For example, the above battery installing-and-removing instruction may include battery charging position information and battery installing-and-removing sequence information. Based on the above battery installing-and-removing instruction, the transporting device may pick the fully charged battery (i.e. the second battery) from the battery compartment and put it into the fully charged battery transfer position (i.e. the second position) according to the battery charging position and battery installing-and-removing sequence indicated by the battery installing-and-removing instruction.

In addition, the battery installation instruction may be an instruction sent when the server determines that the second battery is transported to the second position by the transporting device. Specifically, after the above step 504, the method may further include: sending feedback information to the server by the transporting device when transporting the second battery to the second position. The above step 204 may include: sending a battery installation instruction to the battery installing-and-removing device when the server receives the feedback information and detects that the first battery is transported to the first position.

In the above step 206, after the battery installing-and-removing device generates the battery installation information, the battery installing-and-removing device sends the battery installation information to the server.

Wherein the battery installation information may be information capable of indicating whether the second battery is successfully installed in the electric vehicle. For example, the battery installation information may include a battery-in-place mark, etc.

In the above step 207, after the battery installing-and-removing device sends the battery installation information to the server, the server may receive the battery installation information. The server may send a battery swapping completion instruction to the electric vehicle based on the received battery installation information to notify the electric vehicle of successful battery swapping.

Wherein sending a battery swapping completion instruction to the electric vehicle by the server described above based on the battery installation information may be that: the server may verify the battery installation information and send a battery swapping completion instruction to the electric vehicle when the verification is authentication-passed.

For example, if the above battery installation information includes a battery-in-place instruction, the server verifies whether the battery installation flag is 1. If it is 1, then it indicates that the battery is installed in place, and the server sends a battery swapping completion instruction to the electric vehicle.

The specific embodiment of the battery swapping method provided by the application is described above in combination with FIGS. 2 to 7, and the specific embodiment of the relevant device provided by the application is described below in combination with FIG. 8 and FIG. 9. It can be understood that the relevant description in the following device embodiments can refer to the above method embodiments and will not be repeated for simplicity.

Figure 8:
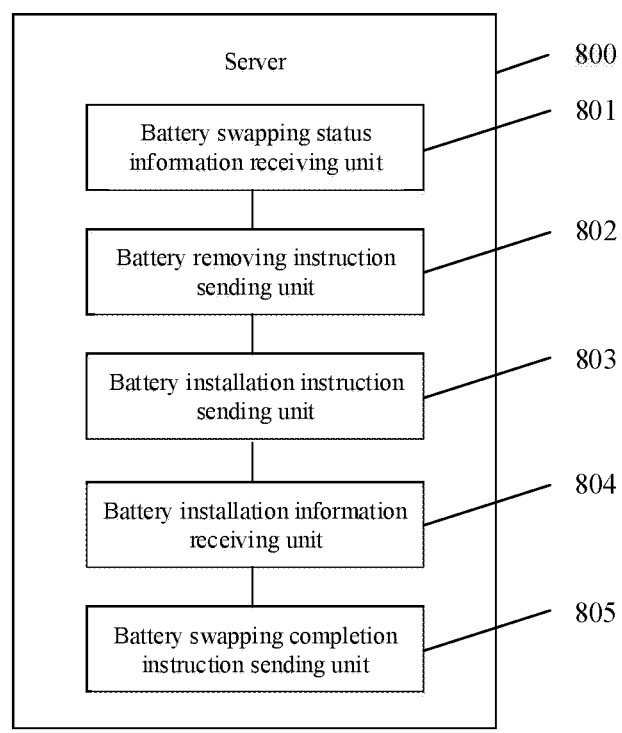
FIG. 8 is a schematic structural block diagram of a server provided by an embodiment of the application.

FIG. 8 shows a schematic structural block diagram of a server 800 according to an embodiment of the present application. As shown in FIG. 8, the server 800 includes a battery swapping status information receiving unit 801, a battery removing instruction sending unit 802, a battery installation instruction sending unit 803, a battery installation information receiving unit 804, and a battery swapping completion instruction sending unit 805.

In one embodiment of the present application, a battery swapping status information receiving unit 801 configured to receive battery swapping status information of an electric vehicle; a battery removing instruction sending unit 802 configured to send a battery removing instruction to a battery installing-and-removing device based on the battery swapping status information, the battery removing instruction being configured for instructing the battery installing-and-removing device to remove a first battery from the electric vehicle and transport the first battery to a first position; a battery installation instruction sending unit 803 configured to send a battery installation instruction to the battery installing-and-removing device when detecting that the first battery is transported to the first position; a battery installation information receiving unit 804 configured to receive the battery installation information sent by the battery installing-and-removing device, the battery installation information being configured for indicating that a second battery is to be installed by the battery installing-and-removing device to the electric vehicle; a battery swapping completion instruction sending unit 805 configured to send a battery swapping completion instruction to the electric vehicle based on the battery installation information; wherein power of the second battery is higher than power of the first battery.

In one possible implementation, the battery swapping station is provided with a first battery compartment, and the first battery compartment comprises at least two charging positions; the server further comprises: a battery transporting instruction sending unit configured to send a battery transporting instruction to a transporting device when detecting that the first battery is transported to the first position, the battery transporting instruction being configured for instructing the transporting device to transport the first battery from the first position to the first battery compartment; a battery identity information receiving unit configured to receive battery identity information of the first battery sent by the transporting device, the battery identity information being information obtained during transportation of the first battery to the first battery compartment by the transporting device; a charging position determination unit configured to determine a charging position corresponding to the battery identity information from the at least two charging positions; a compartment-dividing instruction information sending unit configured to send compartment-dividing instruction information to the transporting device, the compartment-dividing instruction information being configured for instructing the transporting device to transport the first battery to a charging position corresponding to the battery identity information.

In one possible implementation, the server further comprises: a battery-in-place instruction receiving unit configured to receive a battery-in-place instruction sent by the transporting device, the battery-in-place instruction being an instruction sent when the first battery is transported to the charging position corresponding to the battery identity information by the transporting device; the battery installation instruction sending unit 803 is specifically configured to send the battery installation instruction to the battery installing-and-removing device based on the battery-in-place instruction.

In one possible implementation, the server further comprises: a battery installing-and-removing instruction sending unit configured to send a battery installing-and-removing instruction to the transporting device, the battery installing-and-removing instruction being configured for instructing the transporting device to transport the second battery from a second battery compartment to a second position; wherein the battery installation instruction is configured for instructing the battery installing-and-removing device to pick the second battery from the second position.

In one possible implementation, the server further comprises: an identity authentication information receiving unit configured to receive an identity authentication information of the electric vehicle when the electric vehicle travels to a gate entrance and exit, the identity authentication information being information obtained and sent by a gate system of the gate entrance and exit; a vehicle authentication result obtaining unit configured to obtain a vehicle authentication result based on the identity authentication information; a gate opening instruction sending unit configured to send a gate opening instruction to the gate system under a condition that the vehicle authentication result is authentication-passed, the gate opening instruction being configured for instructing the gate system to control a gate at the gate entrance and exit to open.

In one possible implementation, the vehicle authentication result obtaining unit comprises: an identity authentication information sending subunit configured to send the identity authentication information to a cloud server; a vehicle authentication result receiving subunit configured to receive the vehicle authentication result sent by the cloud server, the vehicle authentication result being a result generated by the cloud server based on the vehicle authentication information.

In one possible implementation, the battery swapping station is further provided with an in-station wireless communication module, and the in-station wireless communication module is communicatively connected with the server; the server further comprises: a battery swapping request sending unit configured to send a battery swapping request to the electric vehicle via the in-station wireless communication module when the electric vehicle establishes a wireless communication connection with the in-station wireless communication module; wherein the battery swapping status information is a request sent to the in-station wireless communication module by the electric vehicle based on the battery swapping request.

Figure 9:
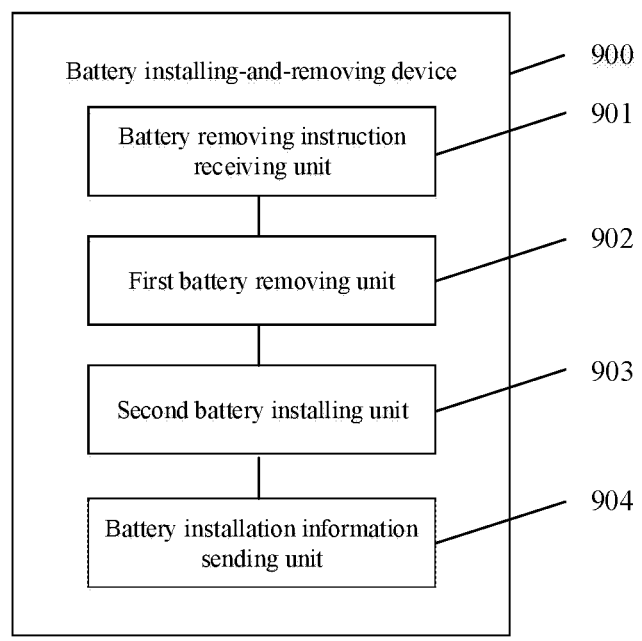
FIG. 9 is a schematic structural block diagram of a battery installing-and-removing device provided by an embodiment of the application.

FIG. 9 shows a schematic structural block diagram of a battery installing-and-removing device 900 according to an embodiment of the present application. As shown in FIG. 9, the server 900 includes a battery removing instruction receiving unit 901, a first battery removing unit 902, a second battery installing unit 903, and a battery installation information sending unit 904.

In one embodiment of the present application, a battery removing instruction receiving unit 901 configured to receive a battery removing instruction sent by a server in a battery swapping station, the battery removing instruction being an instruction sent by the server based on battery swapping status information, the battery swapping status information being information sent to the server by an electric vehicle; a first battery removing unit 902 configured to remove a first battery from the electric vehicle and transport the first battery to a first position based on the battery removing instruction; a battery installation instruction sending unit configured to receive a battery installation instruction sent by the server, the battery installation instruction being an instruction sent by the server when detecting that the first battery is transported to the first position; a second battery installing unit 903 configured to install a second battery into the electric vehicle and generate battery installation information based on the battery installation instruction; a battery installation information sending unit 904 configured to send the battery installation information to the server; wherein power of the second battery is higher than power of the first battery.

In one possible implementation, the first battery removing unit 902 is specifically configured for picking the second battery from a second position and installing the second battery into the electric vehicle based on the battery installation instruction, wherein the second battery is a battery transported from a second battery compartment to the second position by a transporting device based on a battery installing-and-removing instruction sent by the server.

Figure 10:
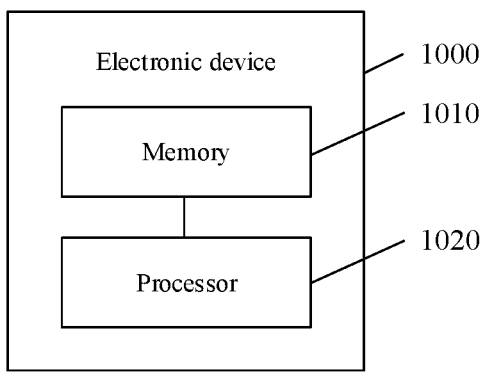
FIG. 10 is a schematic structural block diagram of an electronic device according to an embodiment of the present application.

FIG. 10 shows a schematic structural block diagram of an electronic device 1000 according to an embodiment of the present application. As shown in FIG. 10, the electronic device 1000 includes a memory 1010 for storing computer program and a processor 1020 for reading the computer program and implementing the methods of various embodiments of the present application based on the computer program.

Alternatively, the electronic device 1000 can be used for any one or more of a server and a battery installing-and-removing device. In the embodiment of the application, in addition to the processor in the battery installing-and-removing device reading the corresponding computer program and implementing the battery swapping method corresponding to the battery installing-and-removing device in the foregoing embodiments based on the computer program, the processor in the server may also read the corresponding computer program and implement the battery swapping method corresponding to the server in the foregoing embodiments based on the computer program.

In addition, the embodiment of the present application also provides a readable storage medium for storing computer program for implementing the methods of the foregoing various embodiments of the present application. Alternatively, the computer program may be a computer program in the battery installing-and-removing device and/or server.

It should be understood that the specific examples herein are only to help those skilled in the art to better understand the embodiments of the application, rather than limiting the scope of the embodiments of the application.

It should also be understood that in various embodiments of the application, the sequence number of each process does not mean the order of execution, and the execution order of each process should be determined according to its function and internal logic, and should not limit the implementation process of the embodiments of the application.

It should also be understood that the various embodiments described in this specification can be implemented separately or in combination, and the embodiments of the application are not limited to this.

Although the present application has been described with reference to the preferred embodiment, various improvements can be made without departing from the scope of the present application, and the components therein can be replaced with equivalents. In particular, the technical features mentioned in various embodiments can be combined in any way as long as there is no structural conflict. The present application is not limited to the specific embodiments disclosed herein, but includes all technical solutions falling within the scope of the claims.

What is claimed is:

1. A battery swapping method applied to a server in a battery swapping station, the method comprising:
   receiving battery swapping status information of an electric vehicle, wherein the battery swapping status information indicates whether the electric vehicle is in a state to be power exchanged;
   sending a battery removing instruction to a battery installing-and-removing device upon the battery swapping status information indicating the electric vehicle is in a state to be power exchanged, the battery removing instruction being configured for instructing the battery installing-and-removing device to remove a first battery from the electric vehicle and transport the first battery to a first position;
   sending a battery installation instruction to the battery installing-and-removing device when detecting that the first battery is transported to the first position;
   receiving the battery installation instruction sent by the battery installing-and-removing device, the battery installation instruction being configured for indicating that a second battery is to be installed by the battery installing-and-removing device to the electric vehicle;
   sending a battery swapping completion instruction to the electric vehicle based on the battery installation instruction;
   wherein power of the second battery is higher than power of the first battery,
   the method further comprising:
   receiving a battery-in-place instruction sent by a transporting device, the battery-in-place instruction being an instruction sent when the first battery is transported to a charging position corresponding to battery identity information sent by the transporting device;
   wherein the sending the battery installation instruction to the battery installing-and-removing device comprises:
      sending the battery installation instruction to the battery installing-and-removing device based on the battery-in-place instruction.

2. The method of claim 1, wherein the battery swapping station is provided with a first battery compartment, and the first battery compartment comprises at least two charging positions;
   the method further comprises:
   sending a battery transporting instruction to the transporting device when detecting that the first battery is transported to the first position, the battery transporting instruction being configured for instructing the transporting device to transport the first battery from the first position to the first battery compartment;
   receiving the battery identity information of the first battery sent by the transporting device, the battery identity information being obtained during transportation of the first battery to the first battery compartment by the transporting device;
   determining a charging position corresponding to the battery identity information from the at least two charging positions;
   sending compartment-dividing instruction information to the transporting device, the compartment-dividing instruction information being configured for instructing the transporting device to transport the first battery to a charging position corresponding to the battery identity information.

3. The method of claim 1, further comprising:
sending a battery installing-and-removing instruction to the transporting device, the battery installing-and-removing instruction being configured for instructing the transporting device to transport the second battery from a second battery compartment to a second position;
wherein the battery installation instruction is configured for instructing the battery installing-and-removing device to pick the second battery from the second position.

4. The method of claim 1, further comprising:
receiving an identity authentication information of the electric vehicle when the electric vehicle travels to a gate entrance and exit, the identity authentication information being information obtained and sent by a gate system of the gate entrance and exit;
obtaining a vehicle authentication result based on the identity authentication information;
sending a gate opening instruction to the gate system under a condition that the vehicle authentication result is authentication-passed, the gate opening instruction being configured for instructing the gate system to control a gate at the gate entrance and exit to open.

5. The method of claim 4, wherein the obtaining the vehicle authentication result based on the identity authentication information comprises:
sending the identity authentication information to a cloud server;
receiving the vehicle authentication result sent by the cloud server, the vehicle authentication result being a result generated by the cloud server based on the identity authentication information.

6. The method of claim 1, wherein the battery swapping station is further provided with an in-station wireless communication module, and the in-station wireless communication module is communicatively connected with the server;
the method further comprises:
sending a battery swapping request to the electric vehicle via the in-station wireless communication module when the electric vehicle establishes a wireless communication connection with the in-station wireless communication module;
wherein the battery swapping status information is a request sent to the in-station wireless communication module by the electric vehicle based on the battery swapping request.

7. A battery swapping method applied to a battery installing-and-removing device in a battery swapping station, the method comprising:
receiving a battery removing instruction sent by a server in the battery swapping station, the battery removing instruction being an instruction sent by the server upon battery swapping status information indicating the electric vehicle is in a state to be power exchanged, the battery swapping status information being information sent to the server by an electric vehicle;
removing a first battery from the electric vehicle and transporting the first battery to a first position based on the battery removing instruction;
receiving a battery installation instruction sent by the server, the battery installation instruction being an instruction sent by the server when detecting that the first battery is transported to the first position;
installing a second battery into the electric vehicle and generating battery installation instruction based on the battery installation instruction;
sending the battery installation instruction to the server;
wherein power of the second battery is higher than power of the first battery, and wherein receiving the battery installation instruction sent by the server comprises:
receiving the battery installation instruction based on a battery-in-place instruction sent by a transporting device, the battery-in-place instruction being an instruction sent when the first battery is transported to a charging position corresponding to battery identity information sent by the transporting device.

8. The method of claim 7, wherein the installing the second battery into the electric vehicle based on the battery installation instruction comprises:
picking the second battery from a second position and installing the second battery into the electric vehicle based on the battery installation instruction, wherein the second battery is a battery transported from a second battery compartment to the second position by a transporting device based on a battery installing-and-removing instruction sent by the server.

9. A server comprising:
a battery swapping status information receiving unit configured to receive battery swapping status information of an electric vehicle, wherein the battery swapping status information indicates whether the electric vehicle is in a state to be power exchanged;
a battery removing instruction sending unit configured to send a battery removing instruction to a battery installing-and-removing device upon the battery swapping status information indicating the electric vehicle is in a state to be power exchanged, the battery removing instruction being configured for instructing the battery installing-and-removing device to remove a first battery from the electric vehicle and transport the first battery to a first position;
a battery installation instruction sending unit configured to send a battery installation instruction to the battery installing-and-removing device when detecting that the first battery is transported to the first position;
a battery installation instruction receiving unit configured to receive the battery installation instruction sent by the battery installing-and-removing device, the battery installation instruction being configured for indicating that a second battery is to be installed by the battery installing-and-removing device to the electric vehicle;
a battery swapping completion instruction sending unit configured to send a battery swapping completion instruction to the electric vehicle based on the battery installation instruction;
wherein power of the second battery is higher than power of the first battery,
the server further comprising:
a battery-in-place instruction receiving unit configured to receive a battery-in-place instruction sent by the transporting device, the battery-in-place instruction being an instruction sent when the first battery is transported to a charging position corresponding to battery identity information by the transporting device;

the battery installation instruction sending unit is specifically configured to:
send the battery installation instruction to the battery installing-and-removing device based on the battery-in-place instruction.

10. The server of claim 9, wherein the battery swapping station is provided with a first battery compartment, and the first battery compartment comprises at least two charging positions;
the server further comprising:
a battery transporting instruction sending unit configured to send a battery transporting instruction to the transporting device when detecting that the first battery is transported to the first position, the battery transporting instruction being configured for instructing the transporting device to transport the first battery from the first position to the first battery compartment;
a battery identity information receiving unit configured to receive the battery identity information of the first battery sent by the transporting device, the battery identity information being information obtained during transportation of the first battery to the first battery compartment by the transporting device;
a charging position determination unit configured to determine a charging position corresponding to the battery identity information from the at least two charging positions;
a compartment-dividing instruction information sending unit configured to send compartment-dividing instruction information to the transporting device, the compartment-dividing instruction information being configured for instructing the transporting device to transport the first battery to a charging position corresponding to the battery identity information.

11. The server of claim 9, further comprising:
a battery installing-and-removing instruction sending unit configured to send a battery installing-and-removing instruction to the transporting device, the battery installing-and-removing instruction being configured for instructing the transporting device to transport the second battery from a second battery compartment to a second position;
wherein the battery installation instruction is configured for instructing the battery installing-and-removing device to pick the second battery from the second position.

12. The server of claim 9, further comprising:
an identity authentication information receiving unit configured to receive an identity authentication information of the electric vehicle when the electric vehicle travels to a gate entrance and exit, the identity authentication information being information obtained and sent by a gate system of the gate entrance and exit;
a vehicle authentication result obtaining unit configured to obtain a vehicle authentication result based on the identity authentication information;
a gate opening instruction sending unit configured to send a gate opening instruction to the gate system under a condition that the vehicle authentication result is authentication-passed, the gate opening instruction being configured for instructing the gate system to control a gate at the gate entrance and exit to open.

13. The server of claim 12, wherein the vehicle authentication result obtaining unit comprises:
an identity authentication information sending subunit configured to send the identity authentication information to a cloud server;
a vehicle authentication result receiving subunit configured to receive the vehicle authentication result sent by the cloud server, the vehicle authentication result being a result generated by the cloud server based on the identity authentication information.

14. The server of claim 9, wherein the battery swapping station is further provided with an in-station wireless communication module, and the in-station wireless communication module is communicatively connected with the server;
the server further comprising:
a power exchanging request sending unit configured to send a battery swapping request to the electric vehicle via the in-station wireless communication module when the electric vehicle establishes a wireless communication connection with the in-station wireless communication module;
wherein the battery swapping status information is a request sent to the in-station wireless communication module by the electric vehicle based on the battery swapping request.

15. A battery swapping method applied to a server in a battery swapping station, the method comprising:
receiving battery swapping status information of an electric vehicle, wherein the battery swapping status information indicates whether the electric vehicle is in a state to be power exchanged;
sending a battery removing instruction to a battery installing-and-removing device upon the battery swapping status information indicating the electric vehicle is in a state to be power exchanged, the battery removing instruction being configured for instructing the battery installing-and-removing device to remove a first battery from the electric vehicle and transport the first battery to a first position;
sending a battery installation instruction to the battery installing-and-removing device when detecting that the first battery is transported to the first position;
receiving the battery installation instruction sent by the battery installing-and-removing device, the battery installation instruction being configured for indicating that a second battery is to be installed by the battery installing-and-removing device to the electric vehicle;
sending a battery swapping completion instruction to the electric vehicle based on the battery installation instruction;
wherein power of the second battery is higher than power of the first battery,
the method further comprising:
receiving a battery-in-place instruction sent by a transporting device, the battery-in-place instruction being an instruction sent when the first battery is transported to a charging position corresponding to battery identity information by the transporting device;
wherein the sending the battery installation instruction to the battery installing-and-removing device comprises:
sending the battery installation instruction to the battery installing-and-removing device based on the battery-in-place instruction.

16. A server comprising:
a battery swapping status information receiving unit configured to receive battery swapping status information of an electric vehicle, wherein the battery swapping status information indicates whether the electric vehicle is in a state to be power exchanged;

a battery removing instruction sending unit configured to send a battery removing instruction to a battery installing-and-removing device upon the battery swapping status information indicating the electric vehicle is in a state to be power exchanged, the battery removing instruction being configured for instructing the battery installing-and-removing device to remove a first battery from the electric vehicle and transport the first battery to a first position;

a battery installation instruction sending unit configured to send a battery installation instruction to the battery installing-and-removing device when detecting that the first battery is transported to the first position;

a battery installation instruction receiving unit configured to receive the battery installation instruction sent by the battery installing-and-removing device, the battery installation instruction being configured for indicating that a second battery is to be installed by the battery installing-and-removing device to the electric vehicle;

a battery swapping completion instruction sending unit configured to send a battery swapping completion instruction to the electric vehicle based on the battery installation instruction;

wherein power of the second battery is higher than power of the first battery, the server of further comprising:

a battery-in-place instruction receiving unit configured to receive a battery-in-place instruction sent by the transporting device, the battery-in-place instruction being an instruction sent when the first battery is transported to a charging position corresponding to battery identity information by the transporting device;

the battery installation instruction sending unit is specifically configured to:
  send the battery installation instruction to the battery installing-and-removing device based on the battery-in-place instruction.

* * * * *